United States Patent [19]
Von Heck

[11] Patent Number: 5,438,189
[45] Date of Patent: Aug. 1, 1995

[54] RECORDING-TAPE CASSETTE W/ ANTI-JAM PERIMETER-DECLIVITY

[76] Inventor: Robert W. Von Heck, 3350 Kurtz St., San Diego, Calif. 92110

[21] Appl. No.: 24,388

[22] Filed: Mar. 1, 1993

[51] Int. Cl.⁶ .......................................... G11B 23/087
[52] U.S. Cl. .................................. 242/347; 360/132; D14/121
[58] Field of Search ............... 242/199, 347, 347.2; D14/121; 206/387, 389, 391, 393; 360/132

[56] References Cited

U.S. PATENT DOCUMENTS

| | | | |
|---|---|---|---|
| D. 221,003 | 6/1971 | Cohen | D26/14 |
| D. 248,470 | 7/1978 | Titalesfore | D14/11 |
| D. 262,876 | 11/1978 | Yoshizawa | D14/1 |
| D. 280,815 | 10/1985 | Gelardi | D14/11 |
| D. 333,464 | 2/1993 | Yoshida | D14/121 X |
| 3,642,229 | 2/1972 | Downey et al. | 242/199 |
| 3,891,159 | 6/1975 | Nelson | 242/199 |
| 4,101,096 | 7/1978 | Oishi et al. | 242/199 |
| 4,560,117 | 12/1985 | Shimizu | 242/199 |

*Primary Examiner*—Daniel P. Stodola
*Assistant Examiner*—John Q. Nguyen
*Attorney, Agent, or Firm*—Inventech Co.

[57] ABSTRACT

A tape-cassette of the now popularly standardized dual transfer-spool type, having identical top and bottom mating halves, including a slightly raised mesial anterior portion, having a pair of anterior aperatures for entry of a capstan-drive roller apposed to a central anterior aperture for entry of an electromagnetic-head. Wherein is provided a special "anti-jam" perimeter-declivity formation serving to ameliorate occasional jamming tendancy known to the standard squared perimeter cross-section manner of construction. The notably smooth-running characteristics of this otherwise successful cassette configuration are not in any way compromised, while now rendered virtually care-free as to loading procedure, even in a darkened room.

4 Claims, 2 Drawing Sheets

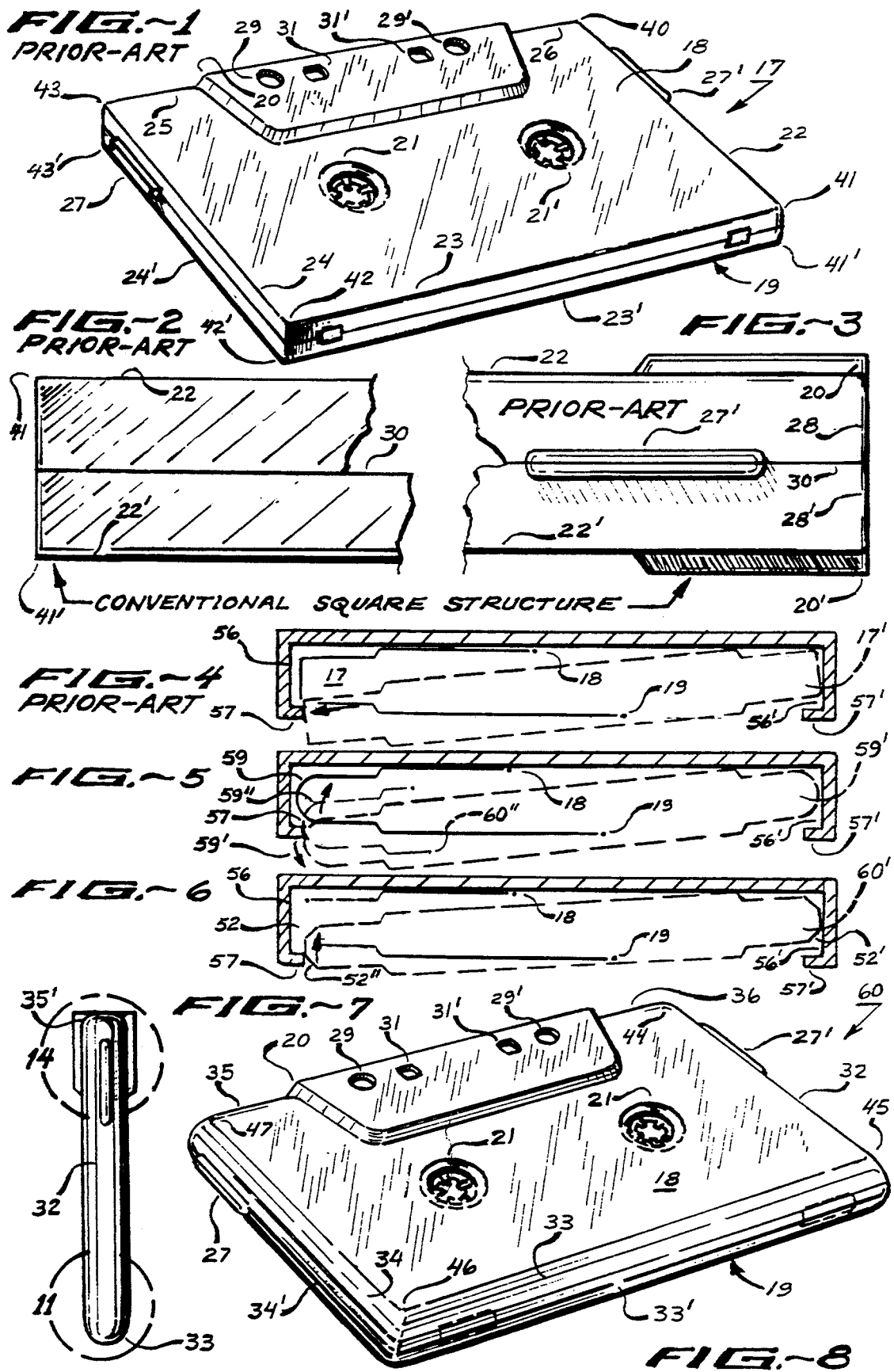

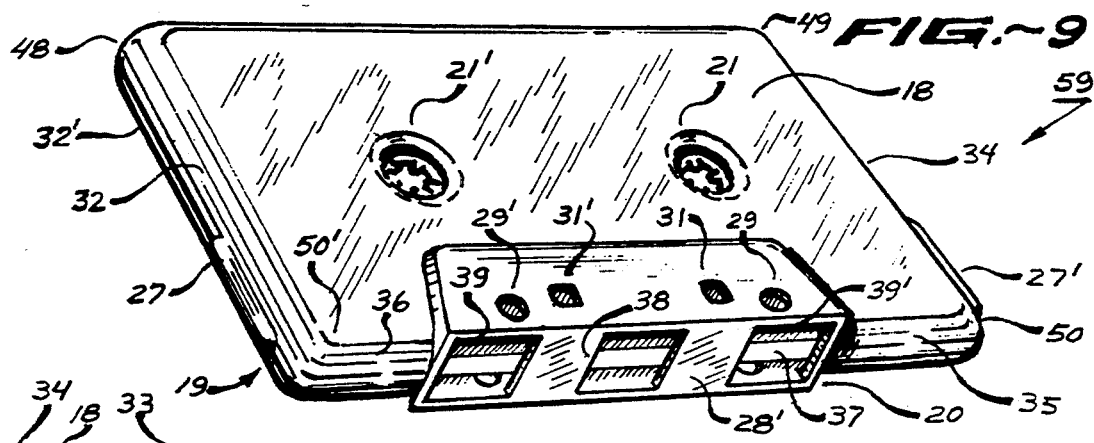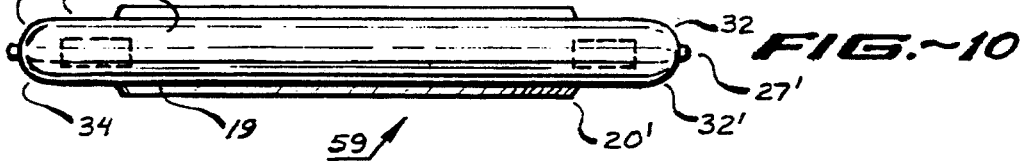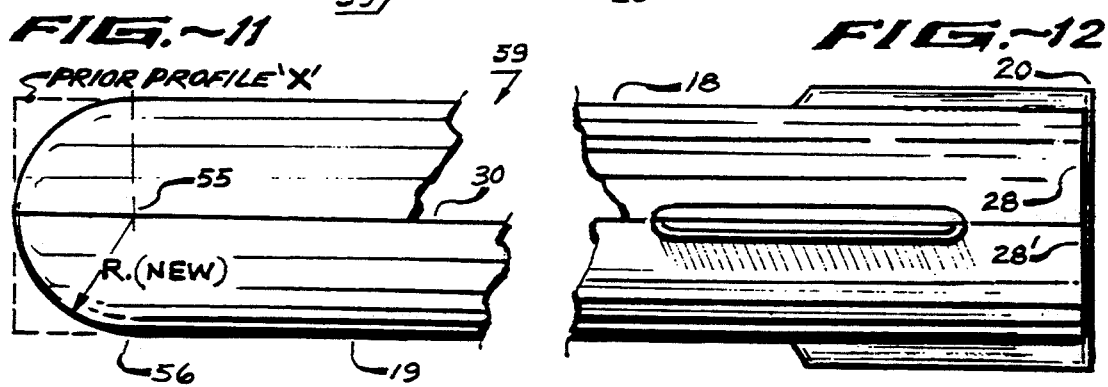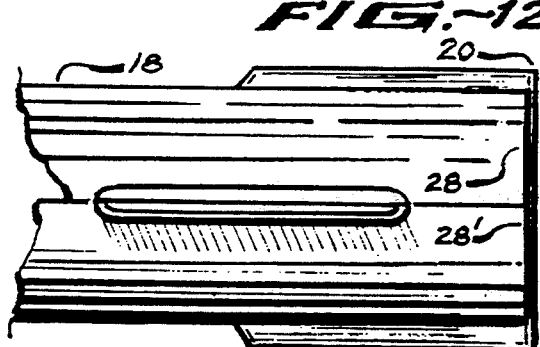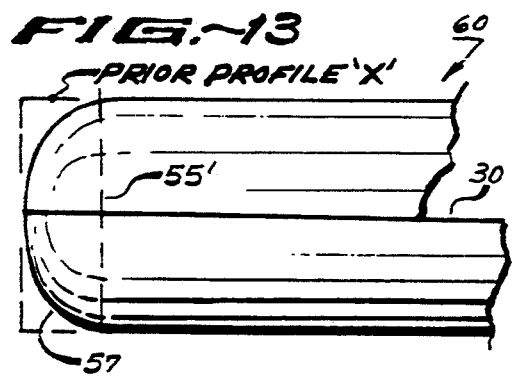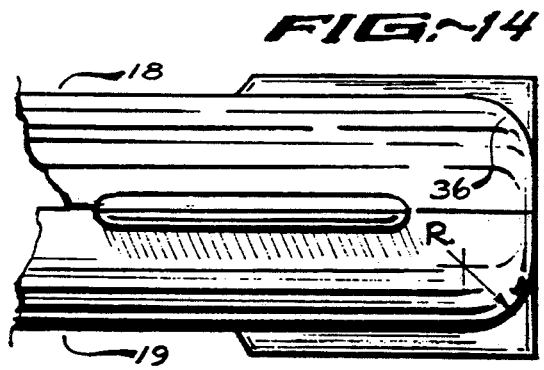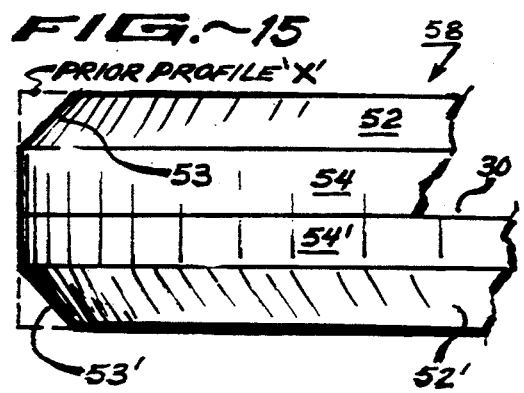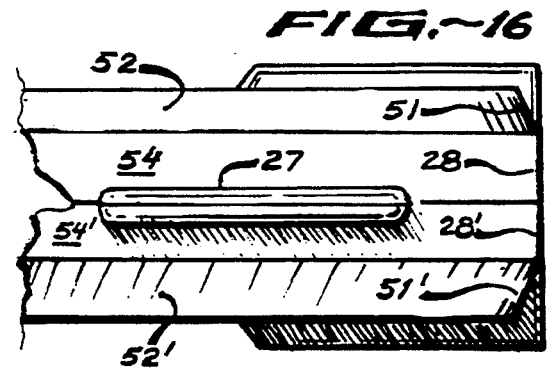

RECORDING-TAPE CASSETTE W/ ANTI-JAM PERIMETER-DECLIVITY

I.) BACKGROUND OF THE INVENTION

This invention relates only to the currently most popular standardized type dualspool invertibly operable mesially-symmetrical tape-cassette, embodying such exterior surface configuration as is typified in U.S. Pat's. #D-280,814 & D-262,876(7) all three being classed: D14/sub.-11: and more specifically, it relates to the traditionally squared-off perimeter edging construction clearly revealed thereto.

Heretofore, it has been the practice to construct the above type cassettes with an abruptly squared perimeter cross-section which over the course of several decades has confounded some perplexed users in it's mild affinity toward becoming jammed in the generally standardized entry-chute portion of an electromagnetic-recorder/player unit. Although literally billions of these industry-standardized cassettes have performed with significant reliability, a servey of a thousand users revealed recently, that the one area of desired improvement prevails in the problem encountered by nearly all users at least once; —that being a predilection for the cassette to become skewedly jammed generally amongst the guide-rails of the above mentioned playing apparatus. This proclivity can be well aggravated in the presence of a darkened room, when one is endeavoring to enhance the evening mood with appropriate music; —only to become embroiled in a pesky situation whereby a cassette having gone unbeknownstly askew, is inadvertently closed into the player-machines's receiver-compartment! This last move naturally still further compounds the problem, to the extent that sometimes the entire player-apparatus must be taken to a repair-station in order the waywardly offending cassette be carefully extricated without damage to either component. Not only can this dastardly situation spoil the mood of the moment, but the added expense of technician-service is unappreciated as well.

Background research discovery provides some prior patent-art regarded as only remotely germane to this disclosure, and only to the extent of non-stereotypical tapecartridges of other types not interchangeable with the standard "cassette"-unit. For example, the circa-1978 U.S. Pat. #D-248,470(classed: D14/sub.-11) to Fairchild Camera & Instrum. Co., in which FIG. 5 shows a tape-cartridge unit having square anterior/posterior portions in conjunction with slightly rounded opposite side portions. This apparent stylization, does not contemplate nor anticipate addressing the problem of skewing in the tilt-out type receiver-tray, because the Fairchild-cartridge (note the finger-grip serrations included at the posterior end, which protrude outward from a machines's mouth-insertion) was made to slide into an entry-mouth remiss of the problematical tilt-out guide-rail members.

Another search specimen tape-cartridge was found in the circa-1971 U.S. Pat. #D21,003 (classed: D26/sub.-14) to Systems-resources Corp., which is a pen-like endless-loop pocket-convenient tape-cartridge principally exhibiting a straight elongated square-sided body with minor radiused anterior and posterior ends included thereto. Again, the very configuration of this embodiment, presupposes use other than that which would necessarily involve any anticipation contemplation of this new instant disclosure; the ends of the Systems-resources cartridge were simply shown rounded because it suited the interposing of internal end-rollers for the endless-tape contained therein, which has nothing to do with facilitating anti-jam problems.

Actually, when viewed in the broad surface-area projected manner, the subject standard/tape-cassette includes very slightly radiused terminations of all four corners; which has no bearing upon the subject anti-jam solution to be subsequently addressed herein: since as with the Systems-resources embodiment above, such application of radii merely serve to make transitions between otherwise substantially planar edging portions.

Accordingly, the invention disclosure hereof is presently being developed as the "SofTouch"-cassette under the auspices of Inventech-Mfg./Mkt. Co., Pt. Loma, Calif.

II.) SUMMARY OF THE INVENTION

A) In view of the foregoing discussion about the earlier invention art, it is therefore important to make it pellucid to others interested in the art that the object of this invention is to provide a conventionally operating standard-cassette for electromagnetic-recording/-playback use, including substantially conventional mirror-image injection-molded or die-cast half portions, which contain in common dual reel like spools which are edgewardly disposed on a common plane. The perimeter split housing also includes a mesially raised anterior portion top and bottom, which include duat-aperatures apposed to a central aperature, the triad of squared aperatures facilitating entry of the capstan-roller and electromagnetic-head of a conventional electromagnetic recording/ playback-machine apparatus. The improvement thereto being in the form of special so called "edgeless-declivity" formation shapes made into both opposed identical halls; whereby the heretofore square-cut perimeter edging is no longer present to pose a possible jamming condition relative to the provisional tilt-out receiver-tray entry-chute guide-rails typical of recording/playback-machine construction.

B.) Another object of this invention resides in the particular cross-sectional formation of the precedingly described new perimeter declivity discovery, essentially serving to overcome any tendancy of the otherwise standard-cassette to slip into a skewed relationship relative to the mentioned guide-rail members, since the significantly more streamlined perimeter shape better slides into the entry-chute(formed by the guide-rails) much more positively and efficiently. Discribing a rather self-aligning action, substantially corrective of any inadvertantly negligent manner by which the cassette may be in effect "crammed" into the entry-chute.

C.) Another object of this invention is to set forth certain preferred declivity cross-sectional shapes, including: an assembled half-circle radiused shape, thereby embodying a quarter-circle arc per each oppositely mating half shell; or, an assembled half-oval or elipse wherein the longer median-base is arranged perpendicular to the normal top and bottom planar surfaces of the cassette body, and the ellipse is preferably an approximate 45°-ellipse. (although 30°-60° will generally sulfice); or, a pentad assembled cross-section, wherein is included parallel top and bottom surfaces, a vertical perimeteredge, all joined via a preferred 45°-chamfer (although 30°-44° will sulfice) opposed top and bottom beveled-edge shape; plus, in some generic variant embodiments of the preceding, a combination of two or more such declivity formations in one cassette body.

III.) DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the Claims section annexed hereto; and accordingly, a better understanding of the invention and the variant uses is intended, by reference to the drawings, which are considered as primarily exemplary and not to be therefore construed as restrictive in nature.

FIG. 1, is a pictorial perspective-view, favoring the posterior upper-left portion of a conventional square cross-sectioned tape-cassette specimen, the inverted-side being a mirror-image thereof;

FIG. 2, is a typical posterior-corner view according to reference projection 2:2 per FIG. 1, shown 4x-enlarged for greater clarity;

FIG. 3, is a typical anterior-corner view according to reference projection 3:3 per FIG. 1, shown 4x-enlarged for greater clarity;

FIG. 4, is a posterior end-view, showing an exemplified condition as to a usual conventional cassette jamming situation relative to conventional entry-chute guide-rails;

FIG. 5, is a posterior end-view, showing a preferred embodiment cassette in exemplified anti-jam deflection operation relative to conventional entry-chute guide-rails;

FIG. 6, is a posterior end-view, showing an alternate embodiment cassette in exemplified anti-jam deflection operation relative to conventional entry-chute guide-rails;

FIG. 7, is a side-elevation view showing the overall new configuration, including two reference-outlined portions:

FIG. 8, is a pictorial perspective-view according to FIG. 1, showing the overall physical structure of a first preferred embodiment;

FIG. 9, is a similar viewing aspect thereto, however favoring the anterior portion thereof:

FIG. 10, is a posterior end-view thereof;

FIG. 11, is a much enlarged detail posterior-corner side-elevation view revealing the first preferred embodiment, showing a pure radiused profile-section, including phantom-outline comparison to that conventional specimen exhibited in FIG. 2;

FIG. 12, is a much enlarged detail anterior-corner side-elevation view of the invention, revealing how the rounded declivity can be extended into a squared anterior end surface;

FIG. 13, is a second preferred generic variant embodiment thereto, exhibiting an ellipsoidal profile-section, including phantom-outline comparison to that conventional specimen exhibited in FIG. 2;

FIG. 14, is a much enlarged detail anterior-corner side-elevation view, revealing how the second preferred embodiment makes transition into a like formed anterior end region;

FIG. 15, is a third preferred generic variant embodiment thereto, including phantom-outline comparison to that conventional specimen exhibited in FIG. 2;

FIG. 16, is an anterior side-elevation view thereof, revealing how the beveled declivities make transition into a similarly formed anterior end region treatment.

V.) DETAILED DESCRIPTION OF THE PREFERRED EMBODIMENTS

Initial reference is given by way of FIG. 1, wherein is exhibited a fully conventional standard/tape-cassette 17 sometimes referred to as a "compact-cassette", such as is generally typified in circa-1985 U.S. Pat's.#D/280,815 and #4,560,117 (FIG. 1, class-242/sub.-199); although there are countless scores of other improvement patents associated with this exceptionally popular cassette configuration, including a substantially identical miniaturized version. However, every one of these known U.S.A and foreign patents without exception, has exhibited the identically typical perimeter treatment, that of a sharply squared-edge formation, which has posed some operational difficulty to the user of perhaps less expensive consumer-type player units. Some professional equipment, such as that utilized by music/radio-stations for example, may employ cassette entry-mouth formations which purposely eliminate the more problematical tilt-out "entry-chute" receiver-tray apparatus, commonly found in the equipment enjoyed by the general public.

The conventional external features of the standard-/tape-cassette exemplified in FIG'S. 1,2,3, include a substantially planar top 18 and coplanar bottom 19, the two opposed sides being mirror-images of each other, and are bounded on all four perimeter sides by a pronounced 90°-sidewall 28/28' having well defined top/-bottom edging portions 22/22', 23/23', 24/24', 25/25', 26/26', thereby terminating substantially into a three-sided apex at each of the eight typical (seven shown) corners 40, 41/41', 42/42', 43/43' thereto. The anterior portion of the cassette includes a slightly raised tape-accessing portion 20/20' set mesially between the two tab like slide-ears 27/27' included at each lateral anterior side; these features being retained substantially unchanged in the new embodiment to be revealed. The conventional cassette is almost always made in two substantially identical mating halfs, as is centrally defined by the split-line 30; and always includes the abaxially arranged dual-spool (reels) take-up indexing ports 21/21', accessible from either side for tape-tension and rapid wind-up(not drive) functions.

Reference to FIG'S. 4,5,6 demonstrates how the instant invention hereof represents a surprising, if significant, improvement over convention. For example, FIG. 4 exhibits how the conventional cassette 17 is supposed to normally align into the entry-chute guide-rails 56/56' having opposed return flanges 57/57' thereto, serving to keep the cassette in place until the entire receiver-tray is manually pivoted away out of sight into the electromagnetic/player-unit(not shown, as is very commonly known supporting-structure). However, as is illustrated, the cassette is known upon occasion to become inadvertently miss-aligned in a manner substantially as is suggested via phantom reference-outline 17' thereto. That such carelessly skewed insertion can lead to considerable difficulty and vexation, has been eluded to herein the preceding invention-summary; but the point being, it does happen to nearly everyone who has endeavored to load the cassette into the receiver-tray in a hurried, mindless situation; or, darkened-room condition.

The example of FIG. 5 then serves to illustrate the discovery of how removal of the straight right-angled wall extending between the top and bottom surfaces 18/19 of FIG'S. 1,2,3, in favor of a most preferred pure radiused-perimeter cross-section presenting virtually no discernable edging per se, acts to eliminate the chance of the cassette perimeter-wall becoming inadvertently wedged against the guide-rail flange 57 or 57' for example. As is illustrated, when the rounded perimeter of the new cassette becomes impinged 60" against the guide-rail 57, the chanches are a thousand-to-one, that the cassette will either ride averted into proper alignment positioning 59, as versus the alternate of riding fully outward 59'; -in which case, the user would feel the cassette fall out of the receiver-tray entirely, and merely reinsert the cassette again more carefully. However, the usual case is that the cassette 59" will be deflected into desired proper alignment 59, since the weight of one's hand inserting the cassette tends to lend proper insertion bias, once the problem of the wide right-angle perimeter edge has been precluded.

In the last representation of FIG. 6, an alternate preferred embodiment 60 is similarly exemplified, wherein the chances for a jamming condition is significantly reduced merely by virtue of the right-angle perimeter-side surface being approximately reduced by half, through presence of the opposed declivities 52/52' acting substantially in the manner explained in FIG. 5. Since declivity surface 52' will tend to send the cassette home into properly aligned condition 60, while declivity surface 52 will tend to avert the cassette fully out of the receiver-tray for a subsequent repeat insertion by the operator. While this may be considered a rather compromise design, having still retained a bit of the offending right-angle perimeter-surface, it nevertheless does offer a significant amount of relief form the conventional configuration; since reducing the amount of right-angle surface area by half, in actuality decreases the probability of encountering a jamming condition by a factor of at most only a quarter of the former chance for such occurance. Accordingly, there remain subtle, however critical differences which are to become more evident and understood as vital improvements.

In FIG. 7 is illustrated the most idyllic side profile embodiment of the disclosure, wherein a pure radiused perimeter is provided along the posterior perimeter 33 and side perimeter 32, while the anterior perimeter region 36 is more of an elipsoidal curvature, primarily owing to the need for internal wall clearance along this region. Study of FIG. 8 shows the new SofTouch-cassette TM embodiment in stark physical if visual contrast to that of conventional cassette FIG. 1. It will be noted, that nothing about the familiar old compact-cassette has been altered but the formation of the new perimeter region, and in this embodiment it may be understood that the corner convegence regions 43,44,45,46, here show the radiused sides 32/33 and 33/34 meeting at the respective corners 45,46 in a relatively sharply terminated corner transition. In further comparison, the perhaps still more preferred embodiment of FIG. 9 includes corner terminus's 47,48,49,50, which in of themselves constitute a generously radiused plan-view transition from one perimeter side around 90° into the adjoining perimeter-side. Thus, FIG. 9 taken in combination with FIG. 7 and the next FIG. 10, would perhaps idyllicly constitute the most preferred embodiment of the disclosure; the detail views of the following FIG'S. 11,12,13,14,15,16, nevertheless reveal how alternate cross-section profiles may be resorted to as viable generic variant generic-variant embodiments, still achieving previously well conveyed invention objectives.

In each of the FIG'S. 11,12,13, a phantom-outline reference comparison to the traditional posterior cross-section profile is given as profile-X', along with the perimeter mating assembly seam 30. Additionally, in FIG. 11, a radius(R) is noted as projected from centerpoint 55, where a reference-line is extended vertically therefrom, thereby indicating a quarter-circle segment immediately to the left thereof, which is preferably blended in smooth transition 56 from the planar regions such as surface 19. Again, by way of further comparison, in FIG. 13, a vertical reference-axis 55' is indicated as the longer transverse-base portion of an approximate 45°-ellipsoidal cross-section 57. Similarly, in FIG. 15, the approximately 45°-chamfer (although 30°–45° suffices) beveled edging 53/53' which merges either with a generous corner radius into respective perimetersides 52/52' in a gentle manner, analogous to that example of FIG. 9; or, the beveled perimeter surfaces may meet at the corners in a more abrupt manner, more analogous to that example of FIG. 8. Reference to the anterior portion treatments are particularly detailed in FIG'S. 12,14,16, wherein FIG. 12 suggests how the radiused perimeter of FIG. 11, or the ellipsed perimeter of FIG. 13, and even the beveled perimeter treatment of FIG.15, may be faired(terminated) into a conventional right-angle planar sided vertical anterior wall 28/28' (upper/lower) which is actually coplanar with the raised anterior tape-access portion 20. The details of this tape-access portion is actually best revealed in FIG. 9, wherein square-apertures 39/39' are the standard entry-ports for the capstan-drive pinchroller(not shown), depending upon which side(side-A/side-B) the cassette is inserted upon. The center square-aperture 38 serves as an entry-port for the recording/playback-head regardless as to the side being played. It is important that this raised tape-access portion then be retained in standard configuration, since it is carefully formed to interface with components built-in to all compatible cassette/-player-units. Note the standard tiny roundholes 29/29' are standard, serving to receive the capstan-shaft; while the inwardly adjacent squarish-holes 31/31' act to receive standard cassette alignment-pegs. The left/right tab like entities 27/27' are also standard, acting as lateral friction reducing clearance-slides. Regarding FIG'S. 14,16, a tighter radius(R) 36 is exhibited in FIG. 14 which can alternately be a shallower 30°-ellipse, while a less inclined 30°-chamfer 51/51' is suggested in FIG. 16; owing as was mentioned earlier, to a desire to facilitate a bit more internal wall-clearance, at this extreme anterior region of the cassette housing structure.

Lastly, not shown in this disclosure are four optionally included phillips-head type assembly-screws, which eliminate otherwise customary chemical-bonding of the thus permanently sealed cassette unit. Since quality cassettes usually include a screwed together housing (enabling possible internal repair access), it is desired any screws be kept countersunk within the outer surface of the new cassette, as has been past practice; certain embodiments of this invention because of the special perimeter declivity feature, thus requiring either deeper countersinking, or slight repositioning of the four usually corner-positioned screws. Thus in aggregate, while the improvements set forth in this disclosure do not actually affect performance of the cassette once properly inserted, the disclosure does constitute refinement discovery serving to further enhance handling ease heretofore not contemplated by others. Previous cassette improvements having been directed particularly toward internal refinements, often involving tape-control and friction-reducing measures, or assembly-simplification for example.

Thus, it is readily understood how the preferred and generic-variant embodiments of this invention contemplate performing functions in a manner not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation. Accordingly, the embodiments of the invention in which an exclusive property or proprietary privilege is claimed, are defined as follows.

What is claimed is:

1. A compact-type tape cassette comprising:
   a housing having substantially identical substantially rectangular first and second housing portions, each housing portion having a substantially rectangular plane surface and side walls extending from the plane surface,
   a pair of tape reels disposed radially edge to edge in said housing and having respective axes parallel to each other and perpendicular to the plane surfaces,
   said side walls forming a side edge perimeter when said housing is assembled, one side of said perimeter having apertures adapted to accommodate entry of a capstan-roller and a head of a recording/playback apparatus,
   said side walls outside of said one side being in the form of a curve extending from each plane surface to form an edgeless curve extending between the plane surfaces when the housing is assembled.

2. The cassette of claim 1, wherein each curve is substantially in the form of a quarter of a circle to form a half-circle curve when the housing is assembled.

3. The cassette of claim 1, wherein each curve is substantially in the form of a quarter of an ellipse to form a half-ellipse when the housing is assembled.

4. A compact-type tape cassette comprising:
   a housing having substantially identical substantially rectangular first and second housing portions, each housing portion having a substantially rectangular plane surface and side walls extending from the plane surface,
   a pair of tape reels disposed radially edge to edge in said housing and having respective axes parallel to each other and perpendicular to the plane surfaces,
   said side walls forming a side edge perimeter when said housing is assembled, one side of said perimeter having apertures adapted to accommodate entry of a capstan-roller and a head of a recording/playback apparatus,
   said side walls outside of said one side having a chamfer extending from each plane surface, said chamfer having a height approximating half the height of the side walls extending from each plane surface.

* * * * *